United States Patent [19]
Vogelsang

[11] Patent Number: 5,069,254
[45] Date of Patent: Dec. 3, 1991

[54] CONDUIT ASSEMBLY FOR CABLING

[75] Inventor: Horst Vogelsang, Herten, Fed. Rep. of Germany

[73] Assignee: Dipl. -Ing. Dr. Ernst Vogelsang GmbH & Co. KG, Herten, Fed. Rep. of Germany

[21] Appl. No.: 450,866

[22] Filed: Dec. 14, 1989

[30] Foreign Application Priority Data

Dec. 22, 1988 [DE] Fed. Rep. of Germany ....... 3843118
Feb. 13, 1989 [DE] Fed. Rep. of Germany ....... 3904199
Feb. 17, 1989 [DE] Fed. Rep. of Germany ....... 3904828

[51] Int. Cl.$^5$ .......................... H02G 3/04; H02G 9/06
[52] U.S. Cl. ...................................... 138/111; 174/95
[58] Field of Search .................... 174/68.3, 95, 96, 97; 138/111, 115, 116, 117; 285/137.1, 188

[56] References Cited

U.S. PATENT DOCUMENTS 742,453 10/1903 Lake .................................. 174/95 X

FOREIGN PATENT DOCUMENTS 1082953 6/1960 Fed. Rep. of Germany ........ 174/95
3540690 5/1987 Fed. Rep. of Germany ........ 174/95
3603849 8/1987 Fed. Rep. of Germany ........ 174/95
1878 of 1892 United Kingdom ................ 138/115

Primary Examiner—Laramie E. Askin
Attorney, Agent, or Firm—Herbert Dubno

[57] ABSTRACT

An array of octagonal extruded plastic tubes connected by flexible webs is folded to form a tube bundle with flat surfaces of the outer octagonal periphery of each tube engaging flat surfaces of two other tubes so that four flat surfaces of the tubes define a square cross section central space for receiving cabling.

8 Claims, 2 Drawing Sheets

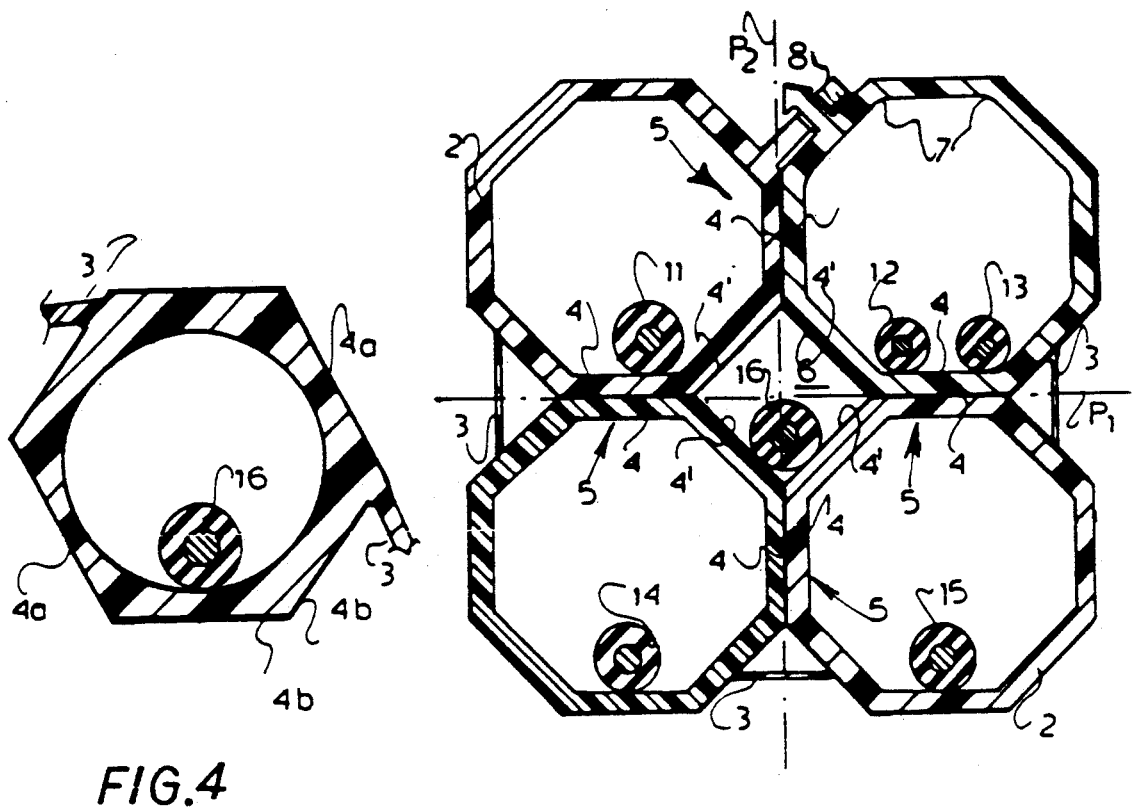
FIG.2
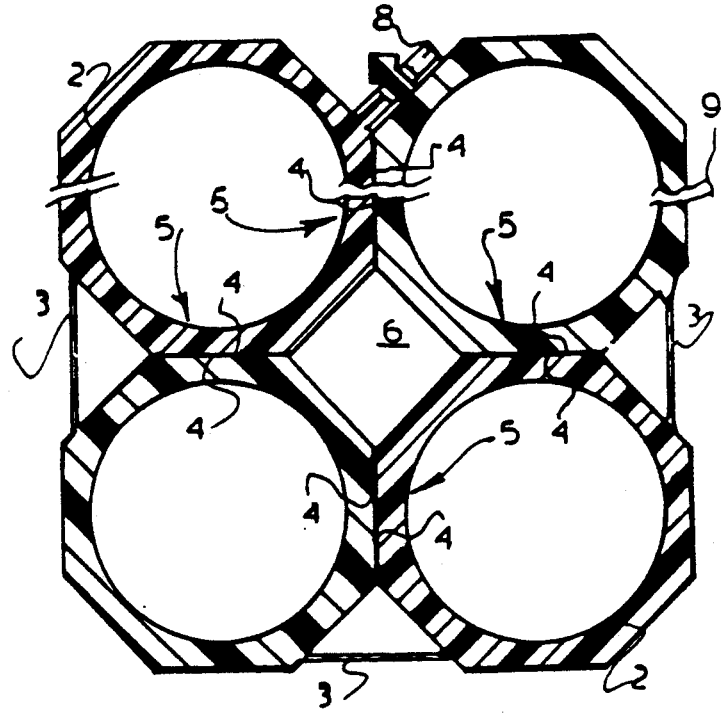
FIG.4
FIG.3

CONDUIT ASSEMBLY FOR CABLING

FIELD OF THE INVENTION

My present invention relates to a conduit assembly for cabling and, more particularly, to a cable assembly which comprises four extruded synthetic resin tubes connected by flexible webs and thereby forming an array which can be bent to bundle the tubes together and form a tube bundle which is symmetrical with respect to two axes in cross section or, more precisely, substantially symmetrical with respect to two mutually orthogonal planes.

BACKGROUND OF THE INVENTION

Plastic or synthetic resin conduit assemblies made up of discrete extruded tubes, connected by webs and adapted to be folded or bent to form a compact tube bundle are known, for example, from German Patent 36 03 849.

In this construction, the synthetic resin tubes have rounded inner and outer peripheries and are adapted to be traversed by wires, conductors or like electrically conductive or optical elements hereinafter referred to generally as cables or cabling and adapted to be use in connections or power supply.

In the assembly of this patent, the individual tubes are formed with outer members providing the contact surfaces between the tubes when they are bundled, generally in the shape of triangular cross section cylinder segments so that the walls of these segments, forming the flat contact surfaces, extend generally radially of the tube bundle or assembly. The outer periphery of the assembly, defined by the contiguous arc-segmental outer walls of the segments, is generally cylindrical.

This construction of the assembly has several drawbacks. Firstly, the cylindrical segmental formations defining the contact surfaces contribute to the high cost of material of the assembly and fabrication problems.

Attempts to modify the construction have led to loss of stability and the inability of the assembly to withstand pressure, for example, from overlying earth when the assemblies are buried.

It has been proposed to utilize cylindrical tubes of sufficient wall thickness to overcome the latter drawback in conduit assemblies formed by tube bundles, but these have the drawback that the cylindrical peripheries of the tubes, when bundled, lie only in line contact with one another. To assure adequate stability of the assembly as a whole, therefore, it has been necessary to provide a supporting core around which the tubes are arrayed and which functions as a stiffening element.

Another problem with earlier tube bundle conduit assemblies, of course, is that these earlier systems required separate members for securing the tubes in their bundled configuration, thereby complicating the formation of the tube bundle configuration for use.

OBJECTS OF THE INVENTION

It is the principal object of the present invention, therefore, to provide a conduit assembly for cabling which will overcome the aforementioned drawbacks, afford greater stability of the tube bundle of the assembly and, in an economical and relatively simple fashion, facilitate optimum use of the assembly for cabling.

Another object of this invention is to provide a conduit assembly for cabling which eliminates the need to provide special formations on the tubes to constitute the contact surfaces between them.

SUMMARY OF THE INVENTION

These objects and others which will become apparent hereinafter are attained, in accordance with the invention, in a conduit assembly wherein the synthetic resin or plastic extruded tubes have an octagonal outer cross section and the spacing webs are so arranged that, in the tube bundle, each tube contacts two adjacent tubes along the flat contact surfaces formed by the octagonal outer periphery and so that others of these surfaces define a central hollow space or core space completely surrounded by the tubes and which can accommodate cabling.

More specifically, a conduit assembly for cabling according to the invention can comprise:

four mutually parallel extruded plastic tubes having generally the same geometrical shapes and adapted to be traversed by respective cables, each of the tubes having a closed inner periphery and an octagonal outer periphery defined by eight angularly adjoining flat surfaces;

respective flexible webs joining the tubes in pairs whereby the tubes can be swung about the respective webs so that two of the flat surfaces of each tube form contact surfaces oriented at a right angle to each other and lying directly against respective flat contact surfaces of two others of the tubes to form a tube bundle therewith having two mutually perpendicular planes of substantial symmetry and defining a central hollow space between the tubes and within the bundle which is defined by flat surfaces of the outer peripheries between each of the two flat contact surfaces; and means for retaining the tubes in a configuration of the bundle.

Preferably, to minimize the amount of material required for the cabling assembly of the invention, the tubes have octagonal inner cross sections as well and these inner cross sections are geometrically similar to the outer cross sections and corresponding thereto.

The corners of the inner cross sections can be rounded as well. With this construction, I am able to obtain especially high stability with the minimum possible use of the thermoplastic material from which the tubes are extruded.

Alternatively, the inner cross section can be round, e.g. circular, while the outer periphery is of octagonal cross section.

The spacing webs according to the invention, in one embodiment, are connected centrally with respective outer surfaces of the tubes.

In another embodiment, the connected webs are joined to the respective surfaces of the octagonal outer periphery at locations offset from the centers of these surfaces and particularly offset outwardly with respect to the tube bundle.

It has been found to be important for the stability of the tube assembly in its configuration as a tube bundle to provide the widths of the spacing webs, i.e. the spacing of the plastic tubes from one another in the planar array before it is bent into the bundle configuration, such that the requisite flat contact between the complementary surfaces of the octagonal outer peripheries can be reliably formed when the tube bundle configuration is generated.

According to a further feature of the invention, the outermost tubes of the array are provided with connecting elements or formations for fixing the tube bundle in this configuration with the tubes directly abutting one another.

The connecting elements can be plug and socket elements, e.g. holes or slots formed in a terminal member on one of the end tubes engaged by barbed projections on the other end tube.

Naturally, the locking elements can be omitted if one prefers to retain the tube bundle in its configuration by encircling bands or ties.

According to a feature of the invention, the synthetic resin tubes, the webs and the locking elements are extruded from a preferably thermoplastic synthetic resin in one piece. A preferred synthetic resin is polyethylene.

In the normal emplacement of such assemblies it may be necessary to have the tube bundle lie along or describe a curve or other arcuate configuration. In that case, the spacer webs and the connecting elements can define a play between the contact surfaces to enable the tube bundle to assume an arcuate configuration in spite of the contact between the contact surfaces.

Indeed, in spite of the flat contact between the outer surfaces of the webs of the tube, the latter will have sufficient freedom of movement to be placed in an arcuate orientation and sufficient flexibility.

In a preferred embodiment of the invention, the tubes have a regular octagonal outer cross section so that all of the outer surfaces are of equal width.

However, the outer cross section can also be a nonregular octagon. The same applies for the inner cross section. In a highly advantageous construction utilizing the latter principles, two opposite sides of the tubes will have a greater side width than that of the remaining sides. In general the cross sections of all of the plastic tubes of the tube bundle will be of the same size so that a highly uniform and compact bundle will result. When this is not a necessity, however, the cross sections of the tubes of a tube bundle can differ from one another.

The assembly of the invention has the advantage that tubes themselves are in contact with one another directly and do not require separate contact-making formations. The material cost is reduced and fabrication is simplified. The tube bundles have high stability and this applies even in the case of buried assemblies which generally are formed with comparative small wall thicknesses.

The thickness of the spacer webs is so selected that it will allow the requisite deformation to permit the array to be bent into a tube bundle.

BRIEF DESCRIPTION OF THE DRAWING

The above and other objects, features and advantages of my invention will become more readily apparent from the following description, reference being made to the accompanying highly diagrammatic drawing in which:

FIG. 1A is a plan view of a portion of this array;

FIG. 1B is a fragmentary plan view of one of the connecting ends of the array;

FIG. 1C is a fragmentary plan view of another connecting end of the array;

FIG. 2 is a cross sectional view of the tube bundle formed from the array of FIG. 1;

FIG. 3 is a cross sectional view of a tube bundle according to another embodiment of the invention; and FIG. 4 is an illustration of a tube construction in which two opposite sides have greater width than the remaining sides and which can be used in the tube bundles of either of FIGS. 2 and 3.

SPECIFIC DESCRIPTION

Figure 1:
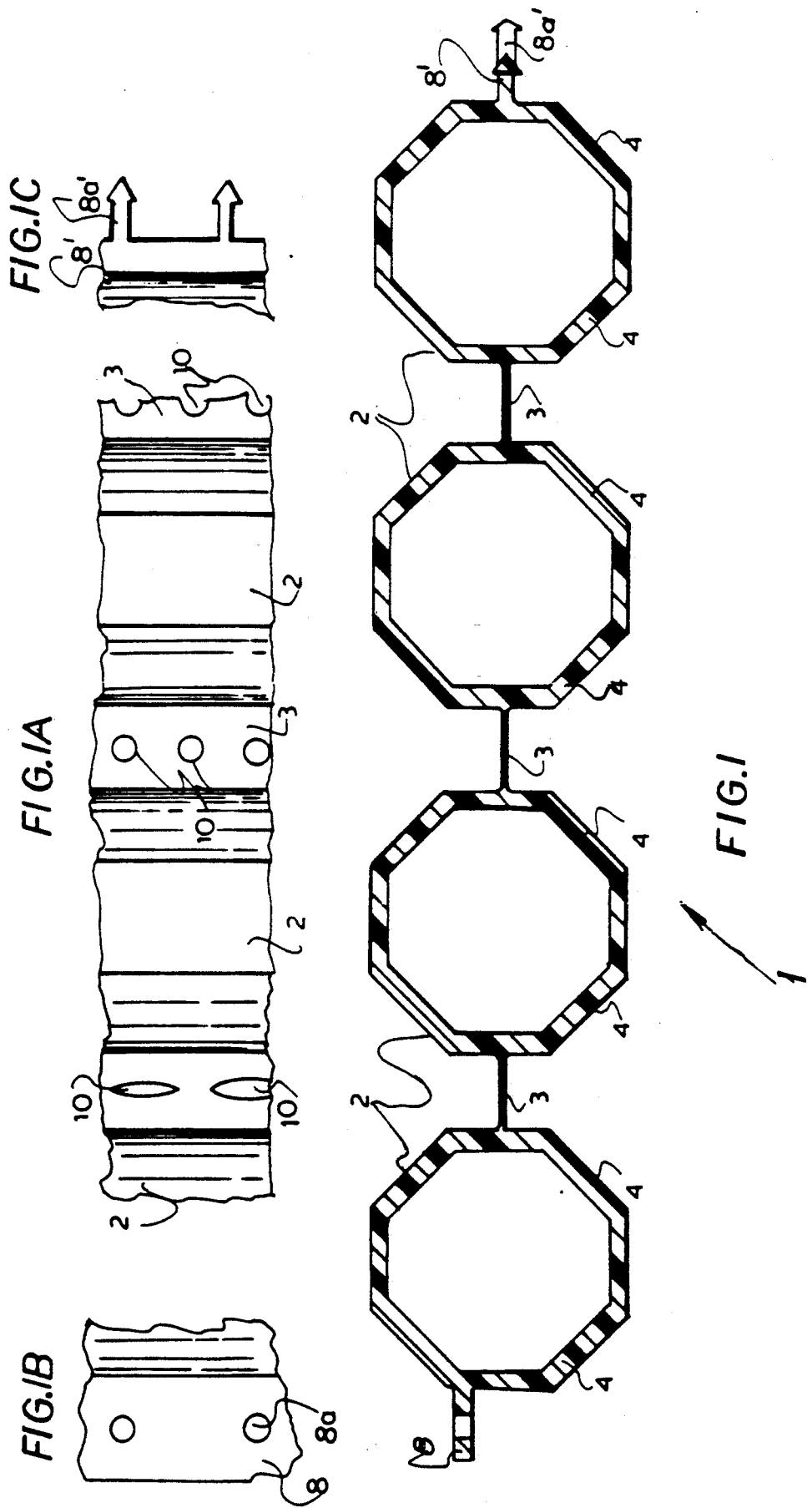
FIG. 1 is a cross sectional view through a tube array adapted to form a tube bundle according to the invention.

The conduit assembly shown in the drawing is intended to receive cables such as the conductors 11, 12, 13, 14, 15 and 16 best seen in FIGS. 2 and 4. While these cables are shown to be electrical conductors, it will be understood that any other type of connection or power cabling may be used as well.

The conduit assembly of the invention comprises four extruded synthetic resin tubes two which are unitarily formed with flexible spacing webs 3 which can constitute so called film hinges and which allow the tube array of FIG. 1, for example, to be folded over into a tube bundle (see FIGS. 2 and 3).

The tube bundle is generally symmetrical about two mutually orthogonal axes or planes $P_1$ and $P_2$ (see FIG. 2).

As can be seen from FIGS. 1 and 2, the plastic tubes can have a regular octagonal outer cross section. The spacer webs 3 are so disposed that, in the tube bundle configuration, two contact surfaces 4 which lie at right angles to one another of one tube will always engage corresponding surfaces 4 of two other tubes so as to define flat contact zones 5 therewith whereas surfaces 4' between the contact surfaces 4 of each tube collectively define a square-section central or core hollow space 6 which also can receive cabling, for example, the cable 16 shown in FIG. 2.

In the embodiment of FIGS. 1 and 2, the tubes 2 have inner octagonal cross sections as well and the corners 7 of the inner cross section are rounded.

In the embodiment of FIG. 3, the tubes 2 have, by contrast, round (i.e. circular) cross section.

In the embodiment of FIGS. 1 and 2, the webs 3 are connected to the respective flat outer surfaces of the octagonal outer cross sections centrally of these surfaces. In the embodiment of FIG. 3, the webs 3 are connected to the respective surfaces at off-center locations offset outwardly with respect to the tube bundle as shown.

In the drawing as well, it can be seen that connecting elements 8, 8' can be provided for fixing the tube bundle in its closed configuration as shown in FIGS. 2 and 3.

These elements are provided on the outermost tubes of the array seen in FIG. 1. The formation 8 is extruded in one piece with the tubes and can be pierced to form holes 8a and the formation 8' at the opposite side can be stamped to form the projections 8a' with respective barbs engageable in the holes 8a.

The plastic tubes 2, webs 3 and connecting elements 8, 8' can all be formed in one piece from polyethylene, preferably by extrusion.

In FIGS. 1 and 2 the cross sections of all of the plastic tubes 2 are shown to have equal size.

It is possible, however, to increase the width of two opposite sides (see FIG. 4 where sides 4a have a greater width than sides 4b) as diagrammatically illustrated by the break lines 9. This can be provided for two or all of the plastic tubes 2 of a given bundle.

As can be seen from FIG. 1A, the webs 3 can be provided with holes or slits 10 which permit drainage of water, especially when the tube bundle is to be used in a subterranean application.

I claim:

1. A conduit assembly for cabling, comprising:

four mutually parallel extruded plastic tubes having generally the same geometrical shapes and adapted to be traversed by respective cables, each of said tubes having a closed inner periphery and an octagonal outer periphery defined by eight angularly adjoining flat surfaces;

respective flexible webs joining said tubes in pairs whereby said tubes can be swung about the respective webs so that two of said flat surfaces of each tube form contact surfaces oriented at a right angle to each other and lying directly against respective flat contact surfaces of two others of said tubes to form a tube bundle therewith having two mutually perpendicular planes of substantial symmetry and defining a central hollow space between said tubes and within said bundle which is defined by flat surfaces of said outer peripheries between each of said two flat contact surfaces; and means for retaining said tubes in a configuration of said bundle, each of said inner peripheries being substantially octagonal, each of said webs being connected to the tubes of a respective pair centrally of a respective one of the flat surfaces thereof.

2. The conduit assembly defined in claim 1 wherein corners of said inner peripheries are rounded.

3. The conduit assembly defined in claim 1 wherein said tubes and said webs form an array having a pair of end tubes at opposite ends of said array, said means for retaining said tubes in said configuration of said bundle including mating formations of said end tubes.

4. The conduit assembly defined in claim 3 wherein said webs and said formations define a play between said contact surfaces and said tube bundle is formed by bending said array arcuately to bring said contact surfaces of said tubes into engagement with one another.

5. The conduit assembly defined in claim 1 wherein said tubes have external configurations of regular octagons in cross section.

6. A conduit assembly for cabling, comprising:

four mutually parallel extruded plastic tubes having generally the same geometrical shapes and adapted to be traversed by respective cables, each of said tubes having a closed inner periphery and an octagonal outer periphery defined by eight angularly adjoining flat surfaces;

respective flexible webs joining said tubes in pairs whereby said tubes can be swung about the respective webs so that two of said flat surfaces of each tube form contact surfaces oriented at a right angle to each other and lying directly against respective flat contact surfaces of two others of said tubes to form a tube bundle therewith having two mutually perpendicular planes of substantial symmetry and defining a central hollow space between said tubes and within said bundle which is defined by flat surfaces of said outer peripheries between each of said two flat contact surfaces; and means for retaining said tubes in a configuration of said bundle, each of said inner peripheries being substantially octagonal, each of said webs being connected to the tubes of a respective pair at a location offset from the center of a respective one of the flat surfaces thereof toward the exterior of said bundle, said tubes having octagonal outer peripheral cross sections having two opposite sides of greater side length than the remaining sides of the respective octagonal outer periphery.

7. The conduit assembly defined in claim 6 wherein said tubes and said webs form an array having a pair of end tubes at opposite ends of said array, said means for retaining said tubes in said configuration of said bundle including mating formations of said end tubes.

8. The conduit assembly defined in claim 7 wherein said webs and said formations define a play between said contact surfaces and said tube bundle is formed by bending said array arcuately to bring said contact surfaces of said tubes into engagement with one another.

* * * * *